Feb. 21, 1928.

D. J. RYAN 1,659,837

METHOD OF AND MEANS FOR MAKING CASTINGS

Original Filed Feb. 23, 1922  6 Sheets-Sheet 1

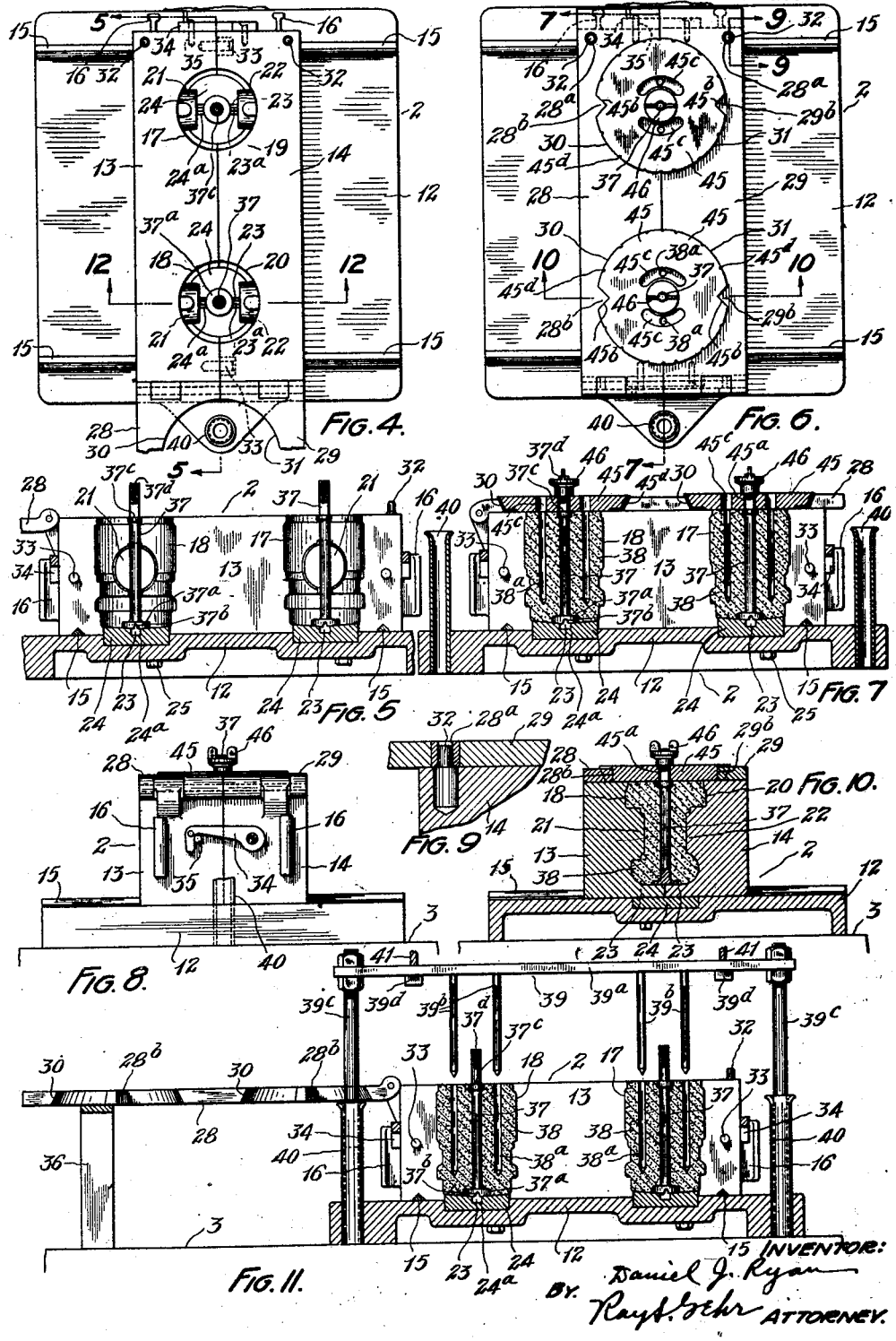

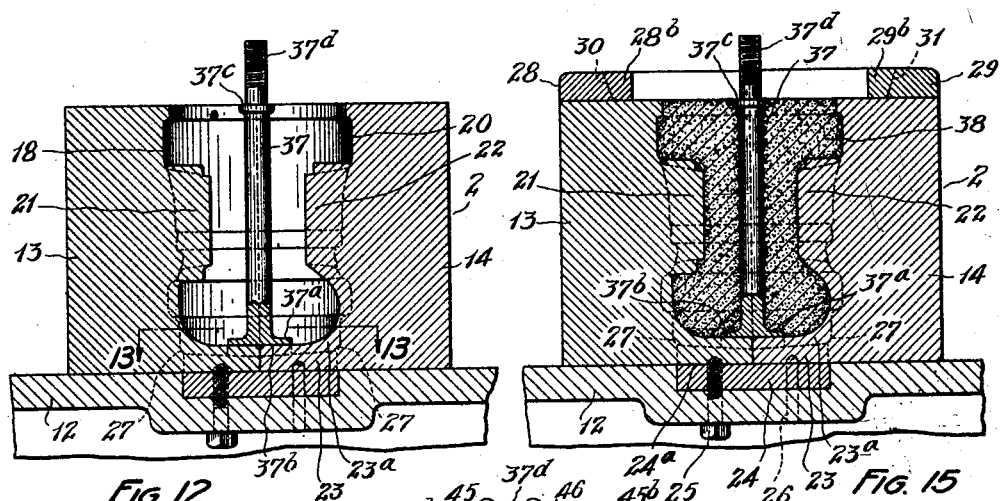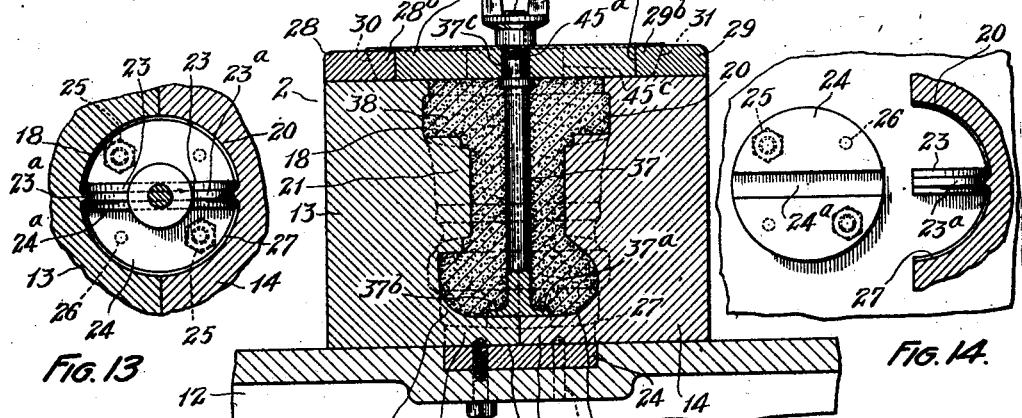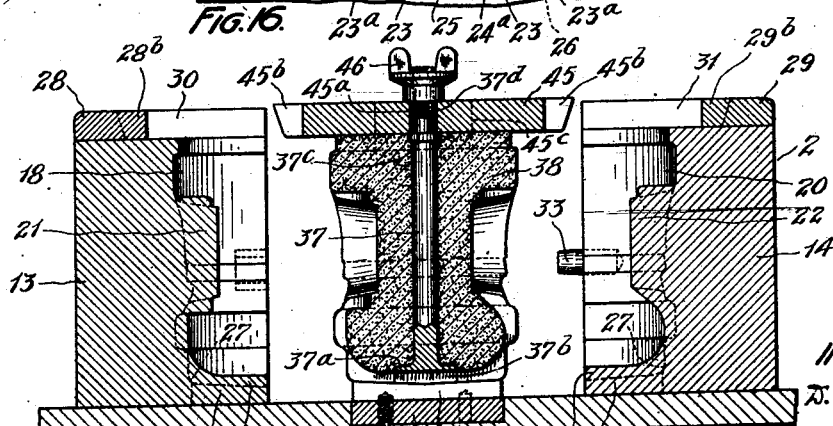

Feb. 21, 1928.
D. J. RYAN
1,659,837
METHOD OF AND MEANS FOR MAKING CASTINGS
Original Filed Feb. 23, 1922   6 Sheets-Sheet 4
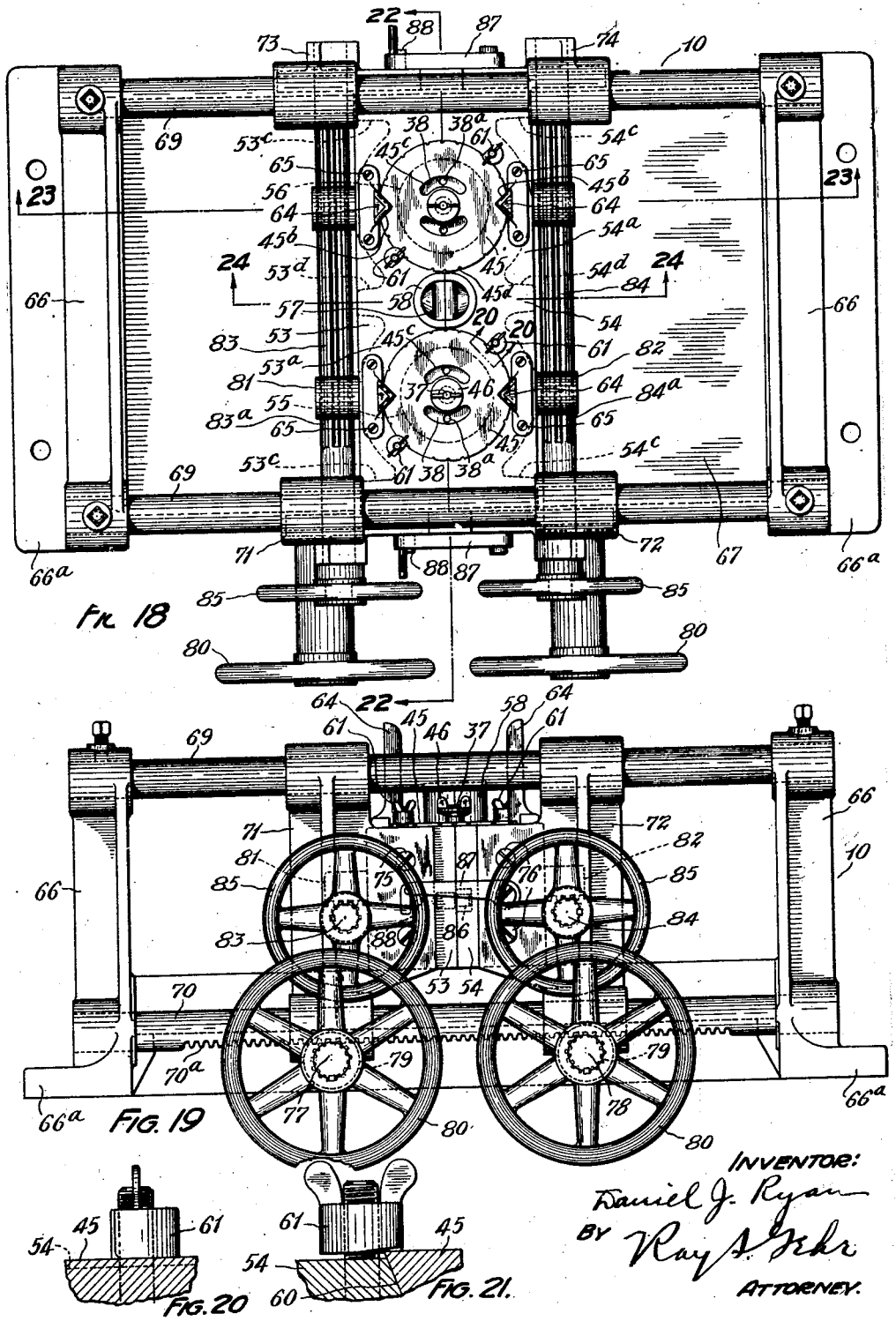

Feb. 21, 1928.
D. J. RYAN
1,659,837
METHOD OF AND MEANS FOR MAKING CASTINGS
Original Filed Feb. 23, 1922    6 Sheets-Sheet 5
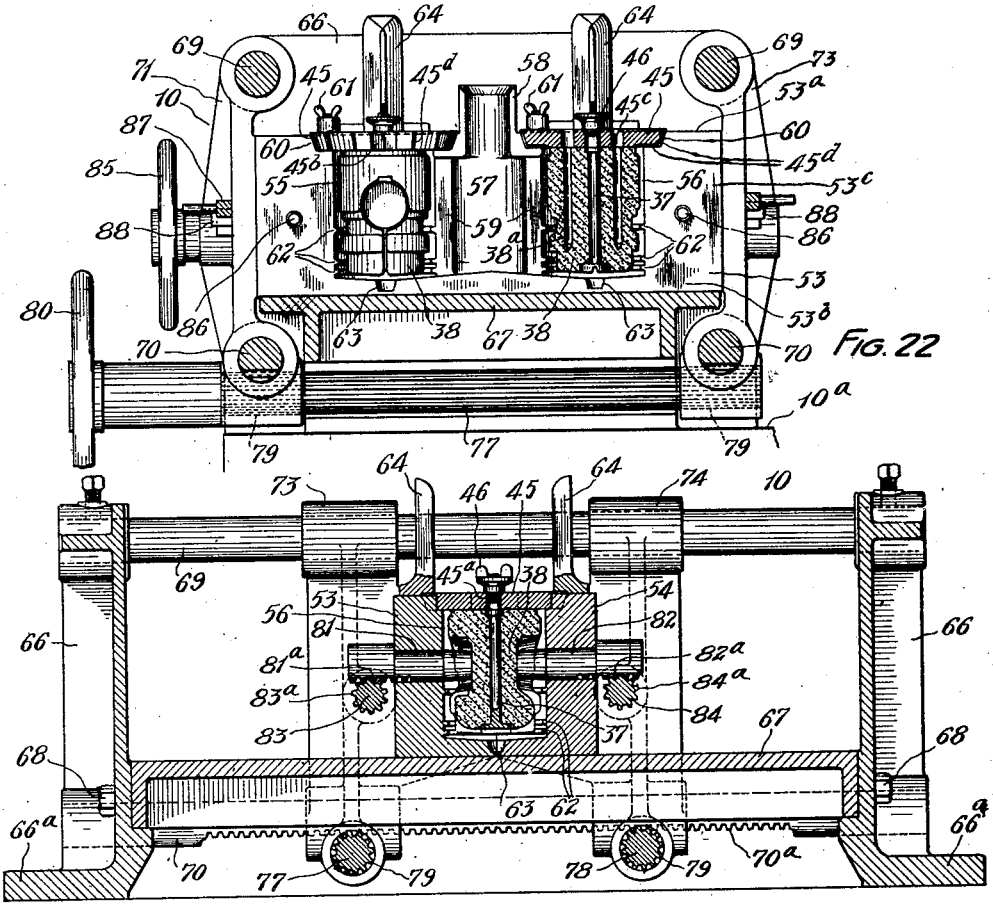
FIG. 22.
FIG. 23.
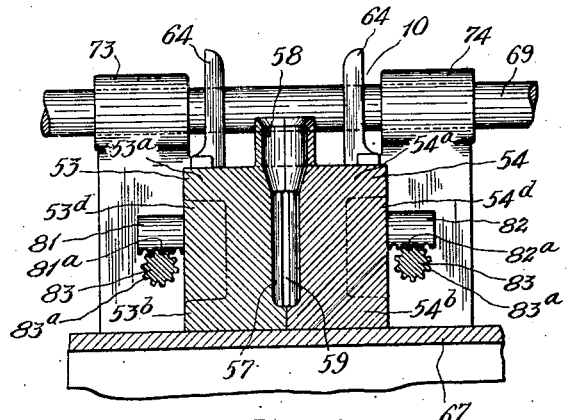
FIG. 24.
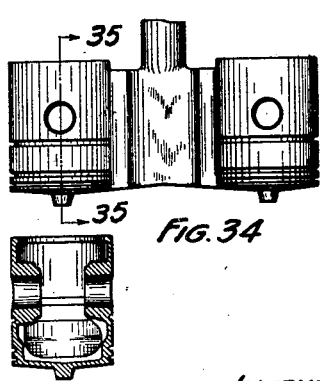
FIG. 34.
FIG. 35.
INVENTOR:
Daniel J. Ryan
BY Ray A. Fehr
ATTORNEY.

Feb. 21, 1928. 1,659,837
D. J. RYAN
METHOD OF AND MEANS FOR MAKING CASTINGS
Original Filed Feb. 23, 1922   6 Sheets-Sheet 6
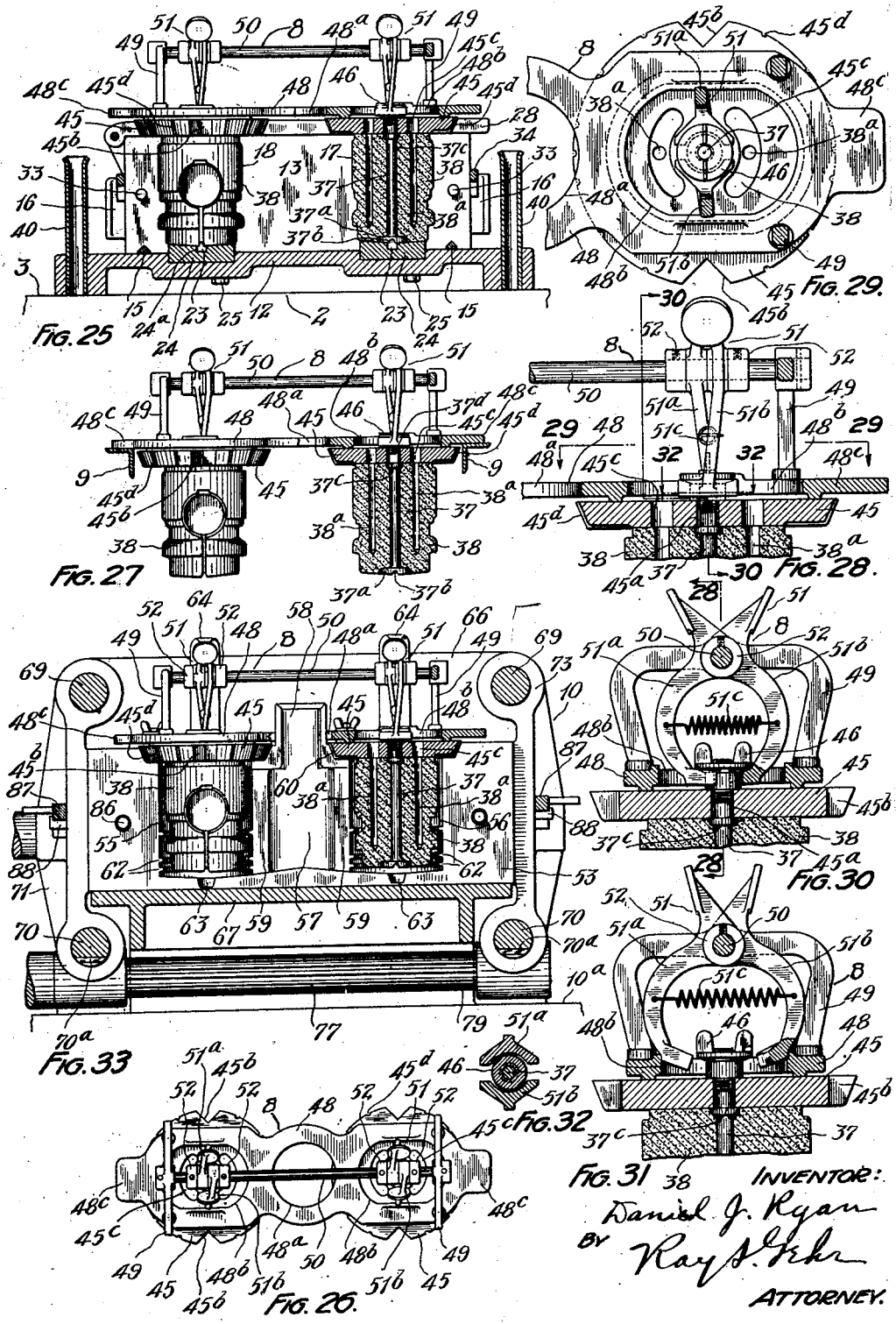
INVENTOR:
Daniel J. Ryan
BY Ray S. Irke
ATTORNEY.

Patented Feb. 21, 1928.

1,659,837

UNITED STATES PATENT OFFICE.

DANIEL J. RYAN, OF CLEVELAND, OHIO, ASSIGNOR TO THE CLEVELAND TRUST COMPANY, OF CLEVELAND, OHIO, A CORPORATION OF OHIO.

METHOD OF AND MEANS FOR MAKING CASTINGS.

Application filed February 23, 1922, Serial No. 538,457. Renewed February 26, 1926.

The invention relates more especially to the making of cup-shaped castings such as skirted pistons of the character used in internal combustion engines.

While the invention is not limited to the use of metals of any particular class, it is especially useful in the making of castings of light weight metals such as aluminum and magnesium alloys. These alloys have relatively low melting points and are relatively soft, in comparison with iron. The natural softness of these metals makes it desirable to chill them when casting in order to make them harder and give the castings better machining and wearing qualities. Accordingly the most satisfactory light alloy pistons have been made in permanent metal molds.

However, the great cost of making and maintaining the multiple part steel cores of these permanent molds and the difficulty of making such piston castings with any but the simplest interior designs, constitute a serious draw-back to the use of the all-permanent mold. Some attempts have been made to overcome these difficulties by the use of permanent mold bodies with ordinary baked sand cores but the resulting saving in cost was not marked and, in addition, such baked sand cores make castings with relatively rough interior surfaces, in comparison with castings made with metal cores. The use of green sand cores in permanent mold bodies also has been considered but, in view of the desirability of disposing the head of the piston casting at the bottom of the mold cavity and the apparent impracticability of suspending a green sand core, the use of such cores has not, prior to my invention, been deemed feasible.

One of the main objects of the invention is the provision of a practical method of and means for making and utilizing cores of green sand, or other equivalent material, in permanent mold bodies for casting pistons or other cup-shape or deeply recessed objects.

Another object of the invention is the provision of semi-permanent mold apparatus for the carrying out of a process of casting pistons or the like, in which process the renewal of the frangible, non-permanent core parts of the apparatus is effected as a part of a continuous cycle of steps constituting the process.

Further objects of the invention which are more or less incidental to those above noted are the improvement of the quality of light alloy piston castings and the reduction of the cost of producing them.

Still other objects, which are more or less incidental or ancillary to those above named, will appear in the following description, as will also the manner of attaining the various objects and the nature of the difficulties overcome by my invention.

Inasmuch as the improved process of my invention will be most readily explained and understood in connection with suitable apparatus for carrying it out, I will first describe a preferred form of such apparatus as shown in the accompanying drawings, and then will explain the manner in which the process is carried out.

In the drawings, Fig. 1 is a plan view in outline showing a suitable layout of my improved apparatus for use in carrying out the invention.

Fig. 4 is a plan view, on a larger scale, of the multiple cavity core box with some of the parts broken away and with the core reinforcing rods in position in the core cavities.

Fig. 5 is a section on the line 5—5, Fig. 4.

Fig. 6 is a plan view of the core box and the completed cores therein.

Fig. 7 is a section on a line 7—7, Fig. 6.

Fig. 8 is an end elevation of the core box with the completed cores therein.

Fig. 9 is an enlarged fragmentary section on the line 9—9, Fig. 6.

Fig. 10 is a section on the line 10—10, Fig. 6.

Fig. 11 is a section on the line 5—5, Fig. 4, showing the means for venting the cores.

Fig. 12 is an enlarged section on the line 12—12, Fig. 4.

Fig. 13 is a fragmentary section on the line 13—13, Fig. 12.

Fig. 14 is a fragmentary horizontal section showing a portion of the core box base and one of the side members drawn back to open position.

Fig. 15 is a view similar to Fig. 12 but with the completed core body of sand or other granular material in the core cavity and with the core print guides swung over into operative positions.

Fig. 16 is a section similar to Fig. 15 but with the core print in position on the top of the core and secured to the reinforcing rod therein.

Fig. 17 is a view similar to Fig. 16 but with the sides of the core box drawn back to open position so that the core can be moved.

Fig. 18 is a plan view of my improved semi-permanent mold.

Fig. 19 is a side elevation of said mold.

Fig. 20 is a fragmentary section on the line 20—20, Fig. 18.

Fig. 21 is a corresponding view taken at right angles to the section of Fig. 20.

Fig. 22 is a vertical section on the line 22—22, Fig. 18.

Fig. 23 is a vertical section on the line 23—23, Fig. 18.

Fig. 24 is a vertical section on the line 24—24, Fig. 18.

Fig. 25 is a vertical section through the core box and the completed cores with my improved core transferring device attached to the cores, some of the parts being shown in elevation.

Fig. 26 is a plan view of said transferring device with the cores suspended therefrom.

Fig. 27 is an enlarged vertical section on the line 27—27, Fig. 1, with some of the parts shown in elevation.

Fig. 28 is a fragmentary vertical section on the line 28—28, Fig. 30.

Fig. 29 is a horizontal section on the line 29—29, Fig. 28.

Fig. 30 is a vertical section on the broken line 30—30, Fig. 28.

Fig. 31 is a view similar to Fig. 30 showing the clamp arms open.

Fig. 32 is a fragmentary section on the line 32—32, Fig. 28.

Fig. 33 is a vertical section through the mold with the core transferring device applied to the cores, some of the parts being shown in elevation.

Fig. 34 is a side elevation of the double piston casting made in my improved mold.

Fig. 35 is a section on the line 35—35, Fig. 34.

Figure 1:
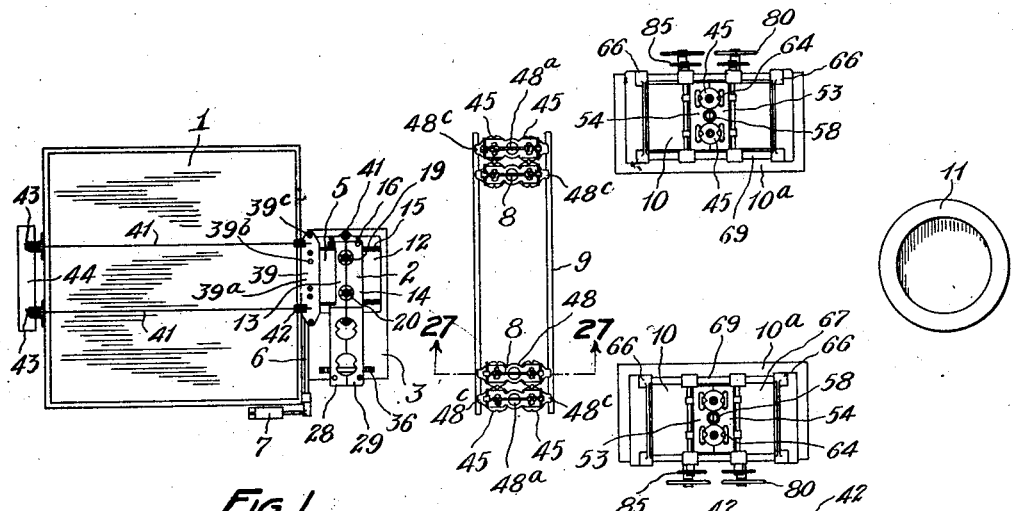
Figure 3:
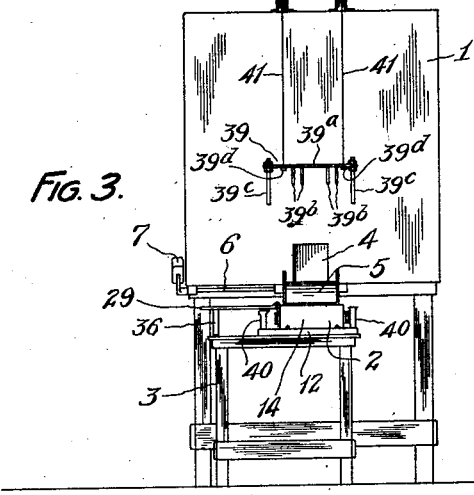
Fig. 3 is a front elevation of the core-forming apparatus including the sand bin.
Figure 2:
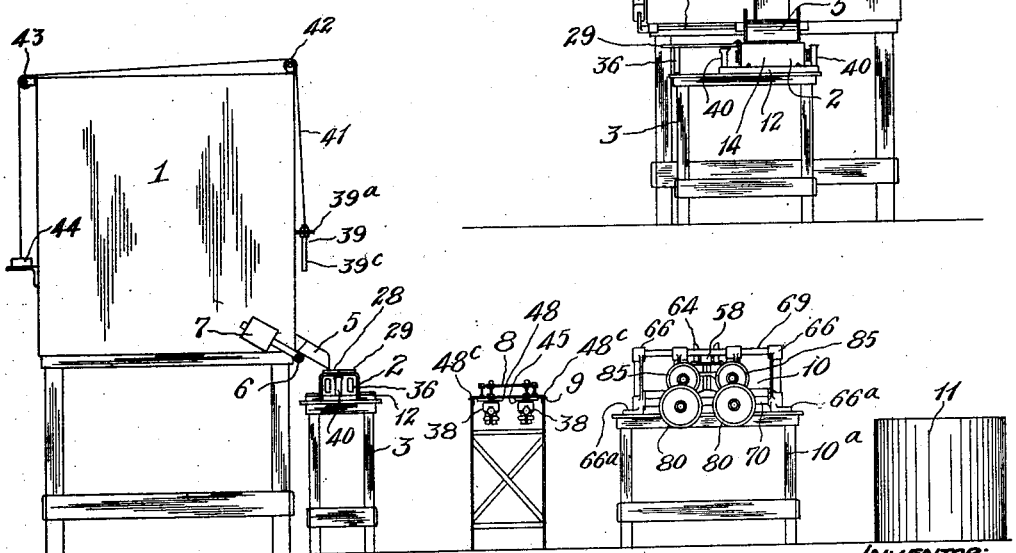
Fig. 2 is a side elevation of the apparatus shown in Fig. 1.

Referring first to Figs. 1, 2 and 3, the apparatus comprises an elevated bin, 1, adapted to hold a considerable supply of the granular core material, preferably "green sand" such as is commonly used in making iron and steel castings. Directly in front of the bin 1 is a core box 2 mounted on a suitable bench 3 and adapted for the making of reinforced cores of green sand. The bin 1 is formed in its front side with a discharge opening 4 which is fitted with a trough-like discharge shoot 5 adapted to convey sand downward and forward to the top of the core box 2. The shoot 5 is pivotally mounted on a rod 6 having at its end a counter weight 7 so that after the desired amount of sand has been drawn down from the bin to the core box, the shoot can be turned upward out of the way of the coremaker.

The core box 2 illustrated is provided with two cavities for the simultaneous making of two cores. When the two cores have been completed, a transfer device 8 is attached to them by the coremaker and, suspended from this transfer device, they are lifted by the coremaker and placed upon the rack 9.

Adjacent the core rack 9 are two molds, 10, 10 mounted on suitable benches 10ª, 10ª and each designed to be operated by one person. The mold operator lifts a pair of cores from the rack 9, lowers them into the two cavities of the mold 10, and, after securing the cores in position, forms the castings by pouring into the mold molten metal dipped with a ladle from a heated holding pot 11. As soon as the molten metal is solidified in the mold cavities the mold is opened, the casting removed, the cores thereof broken out and the reinforcing parts of said cores passed back to the coremaker for re-use, thus completing the cycle of operations.

With this brief outline of the apparatus and procedure in mind, the several parts of the apparatus will now be described in further detail.

The core box 2 which is illustrated in detail in Figures 4 to 17, inclusive, is designed to simultaneously produce two cores for piston castings. Said box comprises a base 12 upon which are slidably mounted two side members 13, 14. The base is provided with two guide rails 15, 15 and the bottom sides of the side members are grooved to fit these rails so that the sliding movement of the side members is guided on right lines. To facilitate their movement manually the side members are provided at their two ends with handles 16, 16. The side member 13 is formed on its inner face with two recesses 17, 18 and the side member 14 is formed with a similar pair of recesses 19, 20 which mate with the recesses 17, 18, respectively, and thus form the side walls of the two open topped cavities of the core box.

On the side walls of the two cavities are formed inwardly projecting bosses 21, 22 corresponding to the wrist pin bosses to be formed on the piston casting. The inner side walls of the core box cavities are also formed with annular grooves or depressions, as shown, in order to provide in the side walls of the piston casting suitable cross sectional dimensions to provide for piston ring grooves and to form strengthening ribs. The side members of the box are also provided at their lower sides with fingers 23, 23 which project radially into the core box cavity and are formed on their upper sides with upstanding ribs 23ª which are extended upward along the side walls of the cavity to join the bosses 21, 22.

The base 12 is provided with two upstanding cylindrical bosses 24, 24 which are spaced apart the same distance as the two core box cavities and serve to form the bottom wall of said cavities. Each boss 24 is formed with a diametrically extending slot 24ª in which the two fingers 23 of the side members fit. The bosses 24 are preferably formed as separate cylindrical blocks and are secured in recess in base 12 by means of screw bolts 25 and dowel pins 26. As is shown by the enlarged views on sheet 3 of the drawings, the side walls of the core box cavities are formed with circumferential fillets 27 where said side walls join the upper edges of the bosses 24. One advantage of the upstanding bosses 24 is that the fillets can be formed above the bottom edges of the side members of the core box and thin metal edges at the lower sides of said fillets are thus avoided. Said bosses also make possible the use of the substantially formed finger extensions 23 so that the ribs 23ª can be strongly supported and made continuous from the axis of the core cavity up to the wrist pin boss recesses.

The base 12 and side members 13 and 14 of the core box can be made of any suitable material, as wood or metal, but I prefer, as in the construction shown to make these parts metal castings. Aluminum alloy castings or other light alloy castings are satisfactory for the purpose, though of course iron or steel castings can be used if desired.

To the left ends of the side members 13 and 14 are hinged plates 28 and 29 which are formed with mating recesses 30, 31 which form substantially circular openings coaxial with the core box cavities and serve a purpose which will presently be explained. The side members 13 and 14 are provided at their right ends with upstanding guide pins 32, 32 which engage bushed openings 28ª, 29ª in the plates 28, 29 and serve to accurately position the right ends of the plates 28 and 29 when the latter are lowered on the side members 13 and 14.

The side member 13 carries on its inner side dowel pins 33 which engage holes in the adjacent face of the side member 14. Thus, the engagement of the side members 13 and 14 with the rails 15 and with the upstanding bosses 24 and the engagement of said side members with each other through the dowel pins 33, serve to accurately align said side members when they are brought together.

To lock the side members together hooks 34, 34 mounted on the ends of the side member 14 engage pins 35, 35 on the ends of the side member 13.

In the production of reinforced green sand cores by means of the core box I proceed as follows:—The side members of the core box are brought together and locked by hooks 34. The plates 28 and 29 are then swung over off the side members as shown in Fig. 11, the bench 3 being preferably provided with a support 36 for said plates. I then introduce into each core cavity an upstanding rod 37. This rod is formed at its lower end with a flange 37ª having on its under side a slot or groove 37ᵇ which fits the ribs 23ª on the finger extensions 23 of the side members. Near its upper end each rod 37 is formed with a collar having an upwardly facing shoulder 37ᶜ disposed in the same plane as the top surfaces of the side members 13 and 14. Above the shoulder 37ᶜ the rod 37 is formed with screw threads 37ᵈ. When the coremaker has set up the rods 37 in the cavities, placing them approximately at the centers of said cavities, he next pulls down sand shoot 5 and with his hands draws from the opening 4 sand to fill the two cavities, pressing the sand in around the rod 37 and the bosses 21, 22 with his fingers in a manner readily understood by those skilled in this art. When the cavities have thus been filled with sand the top surfaces of the core bodies are struck off even with the rod shoulders 37ᶜ and the top surfaces of the side members 13 and 14, as shown in Fig. 11, thus completing the formation of the frangible granular core body 38. In striking off the sand a small metal plate or strip, or any suitable form of straight edge can be employed.

The green sand core bodies thus formed are next properly vented. To accomplish this easily and quickly I preferably provide a venting fixture designated in its entirety by 39, see Figs. 1, 2, 3, and 11. This fixture comprises a plate 39ª with two pairs of depending pins 39ᵇ and two depending guide rods 39ᶜ which are adapted to engage tubular guides 40 mounted in the ends of the core box base 12. The fixture 39 is conveniently supported by cords 41 which pass over guide pulleys 42 and 43 mounted on the top of the sand bin 1 and are secured at their other ends to a counterweight 44. When the coremaker desires to vent the cores it is only necessary for him to draw the fixture 39 downward bringing the rods 39ᶜ into register with the guide tubes 40, and forcing said fixture down until stop blocks 39ᵈ on the plate 39ª engage the top surface of the core box. The venting pins 39ᵇ are thus forced into the sand and, when withdrawn, vent passages 38ª are left in the sand as shown in Fig. 11.

The plates 28, 29 are now swung over on the side members of the core box as shown in Fig. 6 and plate-like metal core prints 45 are placed in position on the tops of the sand bodies of the cores. Each print 45 is provided with a central aperture 45ª adapted to pass over the upstanding threaded end of the rod 37. The periphery of each print is formed to fit the recesses 30, 31 of the top plates 28 and 29 and each print is definitely positioned angularly by notches 45ᵇ therein which engage corresponding projections 28ᵇ, 29ᵇ of the top plates. The prints 45, having been placed in position, are firmly secured to the reinforcing rods 37 by means of wing nuts 46. Thus connected, the rod or anchor 37 and the plate or arbor 45 constitute a rigid core-reinforcing structure with a part thereof embedded in the sand body of the core and a part engaging the upper portion of said sand body and exposed so as to constitute a metallic core print adapted to engage the metal walls of the mold body, as hereinafter described. The prints 45 are formed with arcuate openings 45ᶜ which overlie the vent passages 38ª and insure free egress of vapor and gases from said passages.

With the core prints 45 applied to the cores, the side members 13 and 14 of the core box can be moved rearward and forward, respectively, thus leaving the finished cores standing on the bosses 24, as shown in Fig. 17. To facilitate the handling of the cores, I have devised a core transferring device illustrated in Figs. 25 to 30. This device, designated as an entirety by 8, comprises a skeleton plate or frame 48 formed with a central opening 48ª, elongated end openings 48ᵇ and with end extensions 48ᶜ. Near each end the frame 48 is provided with an upstanding bracket 49 and on these brackets is mounted a longitudinally extending rod 50. On the rod 50 over each of the openings 48ᵇ is mounted a tongs-like clamp 51 which comprises two lever arms 51ª, 51ᵇ which are mounted to turn on the rod 50 but are held against axial displacement by adjustable collars 52, 52. The lower ends of the arms are formed to engage frame 48 as indicated in Fig. 31 and are also formed with jaws adapted to embrace the adjacent wing nut 46 of the core structure, while the upper ends of said arms are formed to be engaged by the thumb and finger of the operator to expand the lower ends of the clamp against the tension of a coil spring 51ᶜ.

When the cores have been formed in the manner above described the transfer device 8 can be attached to the reinforcing structures of the cores as shown in Figs. 25 and 30. To do this the coremaker simply expands the clamping arms 51ª, 51ᵇ so that the latter will pass over the wing nuts 46 as shown in Fig. 31. With the plate 48 of the transfer device resting upon the core prints 45 the clamps are then released by the coremaker so as to allow them to grip the wing nuts in the manner indicated in Fig. 30. The under sides of the flanges of the wing nuts are beveled as shown in Fig. 30 so that the tension of the springs 51ᶜ causes the cores to be clamped snugly between the under side of the plate 48 and the tops of the jaws of the clamp arms 51ª, 51ᵇ.

The transfer device having been attached to the cores, the core box is opened and the cores can then be freely lifted by means of the transfer device and placed upon the supporting rack 9 as shown in Figs. 1, 2 and 27. The brackets 49 of the transfer device serve as handles for convenient lifting of the cores.

In Fig. 1, two of the molds 10, 10 are shown, each being mounted on a suitable bench 10ª, as these molds are alike a description of one will suffice for both of them. The body of the mold consists essentially of two side members or halves 53, 54. The adjacent or abutting faces of the mold halves are formed with recesses to provide two casting cavities 55, 56 and an intermediate gate cavity 57. The gate cavity is provided with a suitable pouring mouth by upstanding extensions 58 formed on the mold halves. The gate cavity 57 communicates with the casting cavities from the bottom to substantially the tops of said cavities through narrow passages 59, 59, the width and thickness of the gate cavity being relatively large in comparison with the thickness of the mold cavity proper, so that the metal in the gate cavity necessarily is the last to freeze or set when the casting has been poured. At the upper ends of the casting cavities the mold halves are recessed to form countersinks 60 to receive the prints 45 of the cores above described. These cores are firmly secured in predetermined position in the mold cavities by wing nuts 61 mounted on screw studs on the tops of the mold halves adjacent to the counter sink 60. Each of these wing nuts has one of its sides cut away so that it can be positioned to permit the lowering of the core into the mold body. By turning the wing nuts down over the edge of the core prints, as shown, the latter are securely clamped in position.

With the cores in position, as shown in Fig. 22, it will be noted that the core print forms the upper annular wall of the casting cavity. To permit free exit of vapors and gases from the casting cavity during the pouring, the side and bottom surfaces of the core prints are formed with venting grooves 45ᵈ. I prefer in some instances to form the side walls of the mold cavity with circumferential ribs 62 in order to form ring grooves on the sides of the piston casting. These ribs are of a form and shape to leave on the casting a small amount of metal to be cut away in machining the grooves. By thus casting the ring grooves the walls of the grooves are more highly chilled and, therefore, wear better. I also prefer to form in the bottom wall of the mold cavity a recess 63 to provide a turning boss on the head of the piston casting.

To facilitate the lowering of the cores into the mold, the mold halves are provided on their upper sides with upstanding guide posts 64, 64 which are adapted to fit the notches 45$^b$ of the core prints. The posts 64 are rigidly secured to the mold halves by screws 65.

The mold halves may be made of cast iron and are preferably formed with top walls 53$^a$, 54$^a$, bottom walls 53$^b$, 54$^b$ and end walls 53$^c$, 54$^c$. There are also vertical strengthening ribs 53$^d$ and 54$^d$ extending between the said top and bottom walls.

The mold halves can be supported for movement toward and from each other in various ways. In the preferred construction shown a supporting frame and mechanism for moving the two mold halves toward and from each other, are provided. The frame has cast end plates 66, 66 formed with bases or pedestals 66$^a$, 66$^a$ adapted to rest upon the bench. These end plates are connected by a bottom plate-like casting 67 to which they are secured by screw bolts 68. The end castings 66 are also connected by a pair of round top bars 69, 69 and a pair of bottom cross bars 70, 70. At the front side of the mold, a pair of slides 71, 72 are mounted on the rods 69, 70 and at the rear side of the mold are similarly mounted a corresponding pair of slides 73, 74. The mold half 53 is rigidly secured to the slides 71, 73 by screws 75 and the mold half 54 is similarly connected to the slides 72, 74 by screws 76. In addition to the support afforded the mold halves by the slides, said mold halves also are slidably supported by the bottom plate 67 of the frame.

To facilitate the opening and closing of the mold halves the frame rods 70, 70 are formed on their under sides with rack teeth 70$^a$. In suitable bearings on the slides 71, 73 is mounted a shaft 77 and on the slides 72, 74 is similarly mounted a shaft 78. Each of these shafts is fitted with pinions 79 which mesh with the rack teeth 70$^a$. Hand wheels 80 are mounted on the front ends of the shafts 77 and 78 and by turning these wheels, the mold halves can be moved toward or from each other on right lines, as will readily be understood.

In utilizing my invention for making piston castings, I prefer to core out the wrist pin bosses. For this purpose I slidably mount a pair of core pins 81 and a similar pair of core pins 82 in the mold halves 53 and 54, respectively. These pins are arranged so that one pair of pins 81, 82 project into one of the casting cavities while the other pair project into the other cavity, in the manner indicated in Fig. 23. When these core pins are in the positions shown in Fig. 23, their inner ends engage the body 38 of the core. To facilitate the withdrawal of the core pins from the castings the inner ends of the said pins are tapered as shown. Each of the pins is formed on its under side with rack teeth 81$^a$ or 82$^a$. The rack teeth 81$^a$ are engaged by pinions 83$^a$ on a transverse shaft 83 mounted in the slides 71, 73 while the rack teeth 82$^a$ are engaged by pinions 84$^a$ on a similar shaft 84 mounted in the slides 72, 74. The front ends of the shafts 83, 84 are provided with hand wheels 85 and both core pins in each mold half can be simultaneously moved inward or outward in relation to the mold cavity by simply turning one of said hand wheels.

To insure accurate alignment of the two mold halves when they are brought together the mold half 53 has its inner face fitted with dowel pins 86 and the opposing face of the mold half 54 is formed with holes to receive said pins. When the mold halves are brought together they can be firmly locked by means of hooks 87, 87 on the ends of the mold half 54 which engage pins 88, 88 on the ends of the mold half 53.

In carrying out my improved process of forming cup-shaped castings, by means of the apparatus above described, the following cycle of operations is performed. A core maker standing at the bench 3 of the core box forms a pair of cores by introducing the core reinforcing rods and the sand into the core box cavities, striking off the tops of the core bodies, venting said core bodies and applying the core prints thereto, in the manner previously described. The core maker then applies the transferring device 8 to the cores, separates the core box and lifts the pair of cores over to the supporting rack 9. A mold operator stationed at one of the molds 10 having meanwhile closed his mold and locked it and moved the core pins 81, 82 to their outer positions, lifts the pair of cores from the rack 9 by means of the transferring device and lowers said cores into the mold cavities where they are accurately positioned and supported by means of the core prints, it being understood that the upstanding guides 64 of the mold insure a proper angular disposition of the boss recesses of the cores in relation to the core pins 81, 82 of the mold. The cores having been lowered to position in the mold, the transferring device is detached from the cores and returned for re-use by the core maker. The cores are then firmly secured in the mold cavities by means of the clamping nuts 61. Then the hand wheels 85 are turned to move the core pins 81, 82 to their innermost position. Thereupon the mold operator with a suitable pouring ladle dips molten metal, such as aluminum alloy, from the heated holding pot 11 and pours the metal through the gate opening 58 of the mold. The molten metal is fed from the gate cavity 57 into both of the mold cavities 55 and 56 to simultaneously form two castings, the metal to form the head part of the piston casting entering the bottom of the casting cavity directly from the gate.

As soon as the initial solidification of the poured metal occurs (as indicated by the shrinkage of the metal in the gate), the mold operator withdraws the core pins 81, 82 by turning the hand wheels 85. Then, after a sufficiently further period to insure thorough setting of the metal of the castings, the mold operator releases the clamping nuts 61, unlocks the mold halves and separates them by turning the hand wheels 80, whereupon the two castings, which are united by the gate metal, can be lifted from the mold.

The green sand cores are readily broken out of the castings, whereupon the reinforcing structure comprising the rods and core prints are passed back to the core maker for re-use.

As one capable core maker can make cores rapidly enough to supply two molds I prefer to arrange the apparatus as shown in Fig. 1 with the two molds 10 conveniently disposed in relation to the rack 9. It is also preferable to provide a helper to pass the transfer devices back to the core maker and to break out the cores from the castings and pass the core rods and prints back to the core maker. With the apparatus arranged as in Fig. 1, the core maker finds it convenient to place the pairs of cores alternately on the two ends of the rack 9 in convenient reach of the respective mold operators. The molten metal holding pot 11 is conveniently placed with respect to both of the molds.

It will be seen that the cycle of steps constituting the process includes the repeated renewal of the frangible cores and that this renewal is effected as the cores are required in the cycle.

As is well understood in connection with the operation of metal molds, the mold body absorbs considerable heat from the molten metal poured into the mold cavity to form the casting. Thus, when my mold is first placed in operation, the first two or three castings poured serve to heat the walls of the mold and as the mold is continued in operation the heat absorbed from the molten metal from each casting serves to heat the metal mold for the subsequent casting or castings poured.

The two-piston casting made by the particular form of my apparatus herein disclosed is shown in Figs. 34 and 35. It will, of course, be understood that the designs of the core and mold body can be varied to produce piston or other deeply recessed castings of a wide variety of forms. The individual piston castings are, of course, to be separated from the gate metal by breaking or by means of a saw or other suitable cutting tool.

The castings formed by my improved process have suitably chilled walls. At the same time the frangible sand cores make it possible to cast piston or other cup-shaped castings with various forms of internal projections which would make the casting of said articles in all-permanent molds impossible. By forming and supporting the frangible cores in the manner described I have found it possible to produce cores with ordinary green molding sand which are adequately strong to withstand all of the necessary handling involved in the carrying out of my process of casting. Furthermore, I produce cored castings with the smooth interior finish characteristic of green sand castings.

Castings made by my process, in addition to the advantages incident to the chilling of the surfaces which require machining and which are subjected to wear, have the additional advantage that the sand core permits the free shrinkage of the casting and thereby avoids shrinkage cracks which often occur in the case of castings made in all-permanent molds because the steel cores of said permanent molds do not permit the casting to shrink freely.

In the making of light alloy piston castings in chill molds it is important that the head of the piston be at the bottom of the mold cavity where the molten metal directly enters, for this insures a dense non-porous structure in the head of the piston. Attempts have been made to cast light alloy pistons in permanent mold bodies with the mold cavity otherwise disposed, as with the piston head uppermost, but these attempts have not been successful probably because the molten metal is in such cases forced to flow over extensive chilling surfaces before it reaches the top of the cavity and porosity results. I believe that the success of my process is in no small measure due to the fact that my improved green sand cores are adapted to be suspended in open top mold cavities so that the head of the piston is disposed at the bottom of the cavity. It will, of course, be seen that with my process the casting cavity is not only freely vented from the top thereof through the grooves formed in the metal parts of the mold but also through the porous body of the core. Consequently, a freer venting is secured than is possible with all-permanent molds.

It is possible to produce green sand cores, such as I have described, with such ease and at so low a cost that I am enabled by my improved process and apparatus to produce light alloy piston casting that are more uniformly of high quality than those produced by all-permanent molds and at a cost substantially lower than is possible with either the all-permanent mold or the semi-permanent mold with baked sand cores.

While I have shown and prefer to use a core reinforcing structure made up of separable parts, in certain of its broad aspects the invention can be practiced with a unitary reinforcing structure. Of course, by having the print section separable from the rod section of the structure, greater freedom is allowed in pressing the sand into the core box cavity, and this advantage is especially important in the case of small size pistons; with pistons of large diameter a unitary reinforcing structure becomes more feasible.

Furthermore, it is to be understood that the particular forms of apparatus shown and described and the particular procedure set forth, are presented for purposes of explanation and illustration and that various modifications of said apparatus and procedure can be made without departing from my invention as defined in the appended claims.

What I claim is:

1. The process of making recessed castings which comprises forming a core of moldable granular material with internal reinforcing means extending to the top of the core, thereafter applying a rigid non-frangible core print to the top of the core and rigidly securing said print to said internal reinforcing means in predetermined relation to the core body, introducing the core into the open-topped cavity of a permanent mold with said print engaging the mold body and maintaining the core suspended and properly positioned in the mold cavity, and introducing molten metal into the cavity to form the casting.

2. The process of making cup-shaped castings which comprises forming a core of moldable granular material with internal reinforcing means extending to the top of the core, thereafter applying a rigid non-frangible core print to the top of the core and rigidly securing said print to said internal reinforcing means in predetermined relation to the core body, introducing the core into the open-topped cavity of a permanent mold with said print engaging the mold body and maintaining the core suspended and properly positioned in the mold cavity, and introducing molten metal into the mold through a gate leading into the bottom of the mold cavity.

3. The process of making cores for cup-shaped castings which comprises positioning reinforcing means in the cavity of a core box, pressing moldable core material into said cavity around the reinforcing means so as to form a frangible core body of definite form and size with the reinforcing means extending above its top surface, thereafter applying a non-frangible core print to the top of said core body, and rigidly securing said print to said reinforcing means in predetermined relation to the core body.

4. The process of making cores for cup-shaped castings which comprises positioning an elongated upstanding reinforcing member on the bottom of a core box cavity, pressing moldable core material into said cavity around the reinforcing means so as to form a frangible core body of definite form and size with the reinforcing means extending above its top surface, thereafter applying a non-frangible core print to the top of said core body, and rigidly securing said print to the reinforcing means in predetermined relation to it and to the core body.

5. The process of making cores for cup-shaped castings which comprises introducing into the open-topped cavity of a core box an upright reinforcing rod with its lower end resting on the bottom wall of the cavity and an upwardly facing shoulder on its upper part disposed at a predetermined level in relation to a top wall of the core box, packing into the cavity around said rod moldable core material, striking off the top of said material to a definite form in relation to said shoulder, placing an apertured non-frangible core print over the upstanding end of said rod with the under side of the print contacting with the said shoulder and the top of the core, securing said print to said rod in firm engagement with its shoulder, and removing the core from the box.

6. The process of making cores for cup-shaped castings which comprises introducing into the open-topped cavity of a core box an upright reinforcing rod with its lower end resting on the bottom wall of the cavity and an upwardly facing shoulder on its upper part disposed at a predetermined level in relation to a top wall of the core box, packing into the cavity around said rod moldable core material, striking off the top of said material to a definite form in relation to said shoulder and top wall placing an apertured non-frangible core print over the upstanding end of said rod with the under side of the print contacting with the said shoulder, top wall and the top of the core, securing said print to said rod in firm engagement with its shoulder, and removing the core from the box.

7. In apparatus for making recessed castings, the combination of means for forming a core that comprises a frangible body of moldable granular material with internal reinforcing means of non-frangible material extending above the top surface of said body, a permanent mold body with an open-topped cavity adapted to receive said core, and a core transferring device adapted to detachably engage the top part of the non-frangible core structure and hold the core suspended while it is being transferred from the core-forming means to the mold.

8. In apparatus for making recessed castings, the combination of a core box for simultaneously forming a plurality of cores of which each comprises a frangible body of moldable granular material with internal reinforcing means of non-frangible material extending above the top surface of said body, a permanent mold body formed with a plurality of open-topped cavities adapted to receive said cores, and a core-transferring device adapted to detachably engage the top parts of the non-frangible core structures and hold the cores suspended while they are being simultaneously transferred from the core-forming means to the mold.

9. In apparatus for making recessed castings, the combination of a core box for simultaneously forming a plurality of cores of which each comprises a frangible body of moldable granular material with internal reinforcing means of non-frangible material extending above the top surface of said body, a permanent mold body formed with a plurality of open-topped cavities adapted to receive said cores, and a core-transferring device comprising a frame and a plurality of manually operable clamps adapted to detachably engage the top parts of the non-frangible core structure and hold the cores suspended while they are being simultaneously transferred from the core-forming means to the mold, said clamps being adjustable toward and from each other to accommodate core boxes and molds of different sizes.

10. In apparatus for forming castings, the combination of a core box with a pair of open-topped cavities adapted for the formation of a pair of cores of which each comprises a frangible body of moldable granular material with internal reinforcing means of non-frangible material extending above the top surface of said body, a permanent mold body formed with a pair of open-topped cavities spaced the same distance apart as the core box cavities and adapted to receive said cores, and a core-transferring device adapted to simultaneously detachably engage the non-frangible top parts of two cores in the core box and hold them suspended while they are transferred to and lowered into the cavities of the mold body.

11. In apparatus for making recessed castings, the combination of means for forming a core that comprises a frangible body of moldable granular material with internal reinforcing means of non-frangible material extending above the top surface of said body, a permanent mold body with an open-topped cavity to receive said core, a core transferring device adapted to detachably engage the non-frangible top part of the core structure and hold the core suspended, and means near the core box and mold for supporting the transferring device with a core suspended therefrom.

12. In apparatus for making recessed castings, the combination of a core box adapted for the formation of cores of moldable granular material with non-frangible internal reinforcing means extending to their top surfaces, means for delivering such granular material to the core box, a permanent mold body having an open-topped cavity adapted to receive one of said cores, a core-transferring device adapted to detachably engage the top part of the reinforcing structure of a core and hold the core suspended while it is being transferred from the core box to the mold cavity, and means adjacent the core box and the mold for supporting said transfer device with a core suspended therefrom.

13. In apparatus for making recessed castings, the combination of a core box adapted for the simultaneous formation of a pair of cores of moldable granular material with non-frangible internal reinforcing means extending to their top surfaces, means for delivering such granular material to the core box, a permanent mold body having a pair of open-topped mold cavities spaced apart substantially the same distance as the core cavities of the core box and adapted to receive a pair of said cores, a core transferring device adapted to detachably engage the top parts of the reinforcing structures of a pair of cores in the core box and to hold said cores suspended while they are being transferred from the core box to the mold cavity, and means adjacent the core box and the mold for supporting said transferring device with its cores suspended therefrom.

14. In apparatus for making recessed castings, the combination of a core box adapted for the formation of cores of moldable granular material with non-frangible internal reinforcing means extending to their top surfaces, means for delivering such granular material to the core box, two similar permanent mold bodies each having an open-topped cavity adapted to receive one of said cores, core transferring devices each adapted to detachably engage the top part of the reinforcing structure of a core and hold said core suspended, and means near the core box and the two mold bodies for supporting said transfer devices with cores suspended therefrom.

15. In apparatus for making frangible cores with non-frangible reinforcing structures, the combination of a base, a pair of abutting side members movable toward and from each other over the base and having their adjacent faces recessed to form the side walls of an open-topped cup-shape core cavity the bottom wall of which is formed by the base, and guiding means for causing the side members to move on definite lines relative to each other.

16. In apparatus for making frangible cores with non-frangible reinforcing structures, the combination of a base, a pair of abutting side members movable toward and from each other over the base and having their adjacent faces recessed to form the side walls of an open-topped cup-shaped core cavity the bottom wall of which is formed by the base, and means on said side members for definitely positioning in relation to said cavity a non-frangible core print to be attached to the core body.

17. In apparatus for making frangible cores with non-frangible reinforcing structures, the combination of a base having thereon an upstanding boss adapted to form the bottom wall of an open-topped cup-shape cavity, and a pair of abutting side members movable toward and from each other over the base and having their adjacent faces recessed to embrace and fit the sides of said boss and to form the side walls of said cavity, the said side walls being formed with fillets where they join the top surface of the boss.

18. In apparatus for making cores for piston castings of frangible material with non-frangible reinforcing means, the combination of a base having thereon an upstanding boss adapted to form the bottom wall of an open-topped cup-shape cavity, said boss being formed with a diametrical slot, and a pair of abutting side members movable toward and from each other over the base and having their adjacent faces recessed to embrace and fit the sides of said boss and to form the side walls of said cavity and each side member having a finger extending radially into the slot in said boss and forming a rib extending upward from the top surface of said boss.

19. In a mold for forming cup-shape castings, the combination of a metallic mold body formed with an open-topped cavity, and a core suspended in the cavity, said core having a frangible body of green sand and a rigid metallic reinforcing structure comprising a portion embedded in said core body and a print portion engaging the upper portion of the core body and engaging the mold body so as to hold the core suspended in the mold cavity in predetermined spaced relation to the walls thereof.

20. In a mold for forming cup-shape castings, the combination of a metallic mold body formed with an open-topped cavity, and a core suspended in the cavity, said core having a frangible body of green sand and a rigid metallic reinforcing structure comprising a portion embedded in said core body and extending to the top thereof and a print portion engaging the upper portion of the core body and rigidly detachably secured to the embedded portion and engaging the mold body so as to hold the core suspended in the mold cavity in predetermined spaced relation to the walls thereof.

21. In a mold for forming cup-shape castings, the combination of a permanent mold body formed with an open-topped cavity and a core suspended in the cavity, said core having a frangible body of green sand and a rigid metallic reinforcing structure comprising a portion embedded in said core body and a print portion engaging the upper portion of the core body and engaging the mold body so as to hold the core suspended in the mold cavity in predetermined spaced relation to the walls thereof and with a metal part of the mold structure forming the annular top wall of the cup-shape cavity of the mold.

22. In a mold for forming cup-shape castings, the combination of a metallic mold body formed with an open-topped cavity, and a core suspended in the cavity, said core having a frangible body of green sand and a rigid metallic reinforcing structure comprising a portion embedded in said core body and a print portion engaging the upper portion of the core body and engaging the mold body so as to hold the core suspended in the mold cavity in predetermined spaced relation to the walls thereof and with the under side of said print section forming the annular top wall of the cup-shape cavity of the mold.

23. In a mold for forming cup-shape castings, the combination of a metallic mold body formed with an open-topped cavity, a core suspended in the cavity, said core having a frangible body of green sand and a non-frangible rigid reinforcing structure comprising a portion embedded in said core body and a print portion engaging the upper portion of the core body and engaging the metallic mold body so as to hold the core suspended in the mold cavity in predetermined spaced relation to the walls thereof, and means to secure the core print section in position relative to the mold body.

24. In a mold for forming a piston casting, the combination of a metallic mold body comprising two side sections movable toward and from each other and recesses on their adjacent faces to form outer walls of the mold cavity, a core suspended in the cavity, said core having a frangible body of green sand with oppositely disposed pin boss recesses and a rigid metal reinforcing structure comprising a portion embedded in said core body and a print portion engaging the upper portion of the core body and the mold body so as to hold the core suspended in the mold cavity in predetermined spaced relation to the walls thereof, and core pins slidably mounted in the mold halves so as to be moved endwise into and withdrawn from the said pin boss recesses.

25. In a mold for forming piston castings, the combination of a permanent mold body comprising two side sections movable toward and from each other and recessed on their adjacent faces to form outer walls of the mold cavity, a core suspended in the cavity, said core having a frangible body of moldable granular material with oppositely disposed pin boss recesses and a non-frangible reinforcing structure comprising a section embedded in said core body and extending to the top thereof and a print section at the upper end of the body secured to the embedded section and engaging the mold body so as to hold the core suspended in the mold cavity in predetermined spaced relation to the walls thereof, and core pins slidably mounted in the mold halves so as to be moved endwise into and withdrawn from the said pin boss recesses.

26. In a mold for forming piston castings, the combination of a permanent mold body comprising two side sections movable toward and from each other and having on their adjacent faces a plurality of pairs of mating recesses to form outer walls of a plurality of mold cavities, cores suspended in said cavities, each core having oppositely disposed pin boss recesses, a plurality of core pins slidably mounted in each mold half to be moved endwise into and withdrawn from the said pin boss recesses, and means mounted on each mold side section for simultaneously moving the core pins mounted thereon.

27. In molds for making cup-shape castings, the combination of a mold body formed with an open-topped cavity, and a core suspended therein, said core having a green sand body and a non-frangible reinforcing structure comprising an upright elongated section with a flange on its lower end forming part of the bottom surface of the core and a plate-like print section secured to the upper end of the elongated section and firmly engaging the top portion of the green sand body.

28. In molds for making cup-shape castings, the combination of a mold body formed with an open-topped cavity, and a core suspended therein, said core having a green sand body and a non-frangible reinforcing structure comprising an upright elongated section with a flange on its lower end forming part of the bottom surface of the core and an upwardly facing shoulder at its upper end and a plate-like print section resting on said shoulder and the top of the green sand body and firmly secured to said elongated body.

29. In a mold for forming cup-shape castings, the combination of a metallic mold body formed with an open-topped cavity, and a core suspended in the cavity, said core having a frangible body of green sand and a rigid metallic reinforcing structure comprising a portion embedded in said core body and a print portion engaging the upper portion of the core body and rigidly detachably secured to the embedded portion and engaging the mold body so as to hold the core suspended in the mold cavity in predetermined spaced relation to the walls thereof.

30. A mold for the casting of hollow articles of aluminum or like metals comprising an arbor for supporting a green sand core and a sectional outer mold provided with a seat for receiving said arbor with the core suspended therefrom within the mold cavity.

31. An apparatus for the forming of cast articles of aluminum and like metals comprising a mold for the forming of a green sand core, an arbor for supporting the core seated upon said mold and provided with means for accurately positioning the same with respect thereto and an outer casting mold having a seat for receiving said arbor, and corresponding means for positioning the same with the core suspended in accurate registration within the mold cavity.

32. An apparatus for forming cast articles of aluminum and like metals comprising a mold for a green sand core having a tapering arbor receiving seat, an arbor for engaging said seat provided with means for accurately positioning the same in relation to the mold cavity and also provided with a projecting anchor around which the sand is impacted, a sectional outer casting mold provided with a seat for receiving said arbor corresponding to the seat in said core mold and adapted to accurately position the green sand core within the mold cavity.

33. An apparatus for forming cast articles of aluminum and like metals, comprising an arbor, means for forming a green sand core supported from said arbor, a casting mold, and guiding means on said casting mold engageable with said arbor to accurately register the core with the mold cavity and to guide the same therein.

34. An apparatus for forming cast articles of aluminum and like metals, comprising an annular arbor of greater diameter than the mold cavity and provided with an inwardly extending lug, an anchor secured to and depending from said lug, means for forming a green sand core depending from said arbor and embedding said anchor, and a casting mold having a seat for receiving said arbor and for holding the core accurately positioned within the mold cavity.

35. An apparatus for forming cast articles of aluminum and like metals, comprising an annular arbor of greater diameter than the mold cavity and provided with an inwardly extending part, an anchor secured to and depending from said part, means for forming a green sand core depending from said arbor and embedding said anchor, and a casting mold having a seat for receiving said arbor and for holding the core accurately positioned within the mold cavity.

36. The combination with a metallic mold having a seat therein, of an arbor having a complementary portion for engaging said seat and a depending anchor extending therefrom, said arbor being provided with an opening adapted for admitting green sand for impounding a green sand core about said anchor.

37. An apparatus for forming cast articles of aluminum and like metals, comprising an arbor, means for forming a green sand core depending from and supported by said arbor, a casting mold having a seat for receiving said arbor, guiding means on said casting mold for engaging said arbor to hold the core in accurate registration with the mold cavity during the engagement of said arbor with its seat, said guiding means being detachably secured to said mold.

38. The process of forming hollow castings of aluminum and like metals, which consists in first forming a green sand core upon an arbor, engaging said arbor with a seat therefor in an outer mold, whereby the core is suspended within the mold cavity of said outer mold and in filling the mold cavity with the molten metal.

39. The process of forming hollow castings of aluminum and like metals, which consists in first impacting a green sand core in anchored relation to a supporting arbor, engaging said arbor with a seat therefor in a preheated sectional mold, and filling said mold with molten metal through a sprue cavity provided therein and in which the molten metal is maintained fluid until after the solidification of adjacent metal in the mold cavity.

40. The process of forming hollow castings of aluminum or like metals, which consists in first impacting a fashioned green sand core in a mold cavity and in anchored relation to an arbor for supporting the same, transferring said arbor and core to a preheated sectional outer mold, guiding said core and arbor in axial alignment with the outer mold and lowering the same into a seat for the arbor which holds the same accurately positioned axially and rotatively, and filling the mold cavity with molten metal through a sprue connection, maintaining the metal fluid therein until after the congealing of adjacent metal in the mold cavity.

41. The process of forming hollow castings of aluminum and like metals, which consists in mechanically impacting a green sand core in a fashioned mold cavity and in anchored relation to an arbor for supporting the same, transferring said arbor and suspended core into axial alignment with the mold cavity of a preheated sectional outer mold having a seat for said arbor, lowering said arbor into engagement with its seat, whereby said core is suspended within said mold cavity, filling the mold with molten metal and through a sprue of sufficient dimensions to quickly fill the mold cavity and to maintain the metal fluid within said sprue until after the solidification of adjacent metal in the mold cavity, removing the casting from the mold and detaching the arbor and returning the same to receive another core.

42. An apparatus for the forming of cast articles of aluminum or like metals comprising a mold for a green sand core provided with a seat for receiving a core supporting arbor, an arbor for engaging said seat, a core anchor depending from said arbor within the core mold cavity, and a sectional outer mold having a corresponding seat for said arbor and for holding the core suspended therefrom accurately positioned within the mold cavity.

43. An apparatus for forming castings of aluminum and like metals comprising an annular arbor, having a substantially unobstructed opening therethrough, a core mold for receiving said arbor provided with means for accurately positioning the same, an anchor depending from said arbor within the mold cavity and around which the sand entering through said annular arbor is impacted, and a casting mold for receiving the arbor and its depending core provided with corresponding means for accurately positioning the same.

In testimony whereof, I hereunto affix my signature.

DANIEL J. RYAN.